(12) United States Patent
Buchmann (10) Patent No.: US 9,561,911 B2
(45) Date of Patent: Feb. 7, 2017

(54) CONVEYOR SYSTEM COMPRISING PORTABLE TRANSPORT MODULES

(71) Applicant: SSI SCHAFER PEEM GMBH, Graz (AT)

(72) Inventor: Rainer Buchmann, Graz (AT)

(73) Assignee: SSI SCHÄFER PEEM GMBH, Graz (AT)

( * ) Notice: Subject to any disclaimer, the term of this patent is extended or adjusted under 35 U.S.C. 154(b) by 0 days.

(21) Appl. No.: 14/676,259

(22) Filed: Apr. 1, 2015

(65) Prior Publication Data
US 2015/0259153 A1 Sep. 17, 2015

Related U.S. Application Data (63) Continuation of application No. PCT/EP2013/070006, filed on Sep. 25, 2013.

(30) Foreign Application Priority Data

Oct. 2, 2012 (DE) ........................ 10 2012 019 717

(51) Int. Cl.
*B65G 37/02* (2006.01)
*B65G 17/20* (2006.01)

(52) U.S. Cl.
CPC ............... *B65G 37/02* (2013.01); *B65G 17/20* (2013.01); *B65G 2207/30* (2013.01)

(58) Field of Classification Search
None
See application file for complete search history.

(56) References Cited

U.S. PATENT DOCUMENTS 4,676,144 A * 6/1987 Smith, III ............... F24F 3/161
454/187
4,905,363 A 3/1990 Boyenval
(Continued)

FOREIGN PATENT DOCUMENTS

DE 60130048 T2 5/2008
EP 1 529 008 B1 3/2008
(Continued)

OTHER PUBLICATIONS

International Search Report for corresponding International Patent Application No. PCT/EP2013/070006 dated Dec. 20, 2013.

*Primary Examiner* — Kavel Singh
(74) *Attorney, Agent, or Firm* — Renner, Otto, Boisselle and Sklar LLP (57) ABSTRACT

A portable conveyor system comprising a modularly constructed conveyor and a plurality of transport modules each formed of a plurality of previously installed and previously tested conveyor components, wherein the modules are arranged at least one of directly adjacent next to each other and on top of each other for commonly forming the system in a connected state, wherein the conveyor comprises: a plurality of conveying lines commonly forming, with regard to material flow, a predefined course of conveying lines, wherein each of the conveying lines comprises a separate machine frame; at least one drive unit; at least one control device; and transport means movable along the course of conveying lines by the at least one drive unit in order to transport load supports through the system; and wherein each of the modules comprises: a standardized exterior dimension; a support structure, a dimension of which is adapted to the standardized exterior dimension; and at least one of the conveying lines, wherein the machine frame of (Continued)

the at least one of the conveying lines is connected permanently to the support structure.

19 Claims, 7 Drawing Sheets

(56) References Cited

U.S. PATENT DOCUMENTS

| | | | |
|---|---|---|---|
| 5,150,781 A * | 9/1992 | Deisenroth | B65G 1/0478 198/349.8 |
| 5,785,168 A * | 7/1998 | Beall, Jr. | B65G 35/063 104/166 |
| 2008/0178537 A1 | 7/2008 | Spangler et al. | |
| 2009/0277749 A1 | 11/2009 | Spangler et al. | |

FOREIGN PATENT DOCUMENTS

| | | |
|---|---|---|
| EP | 1 474 347 B1 | 4/2008 |
| EP | 2377782 A2 | 10/2011 |
| FR | 2568861 A1 | 2/1986 |
| GB | 2 263 457 A | 7/1993 |
| WO | 2006/103348 A1 | 10/2006 |
| WO | 2009/120591 A2 | 10/2009 |

* cited by examiner

CONVEYOR SYSTEM COMPRISING PORTABLE TRANSPORT MODULES

CROSS-REFERENCES TO RELATED APPLICATIONS

This application is a continuation application of the international application WO 2014/053380 A1 (PCT/EP2013/070006) filed on Sep. 25, 2013, which claims priority of the German patent application DE 10 2012 019 717.9 filed on Oct. 2, 2012. Both afore-mentioned applications are incorporated fully herewith by reference.

BACKGROUND OF THE INVENTION

The present invention relates to a portable (conveyor) system having a modularly constructed conveyor, preferably having a modularly constructed overhead conveyor, which comprises previously installed and previously tested conveyor components, wherein the modules are arranged directly adjacent next to each other and/or on top of each other for forming, in a connected state, the system in common.

RELATED PRIOR ART

Conventional conveyor systems are established, tested, and started-up at the site of a system operator, i.e. typically in a warehouse or in a goods distribution center. Often the factory hall is constructed dependent on requirements which are preset by the conveyor system. Conveyor-system components, which form the conveyor system, are frequently connected fixedly to the factory hall and consequently cannot be changed with regard to a position thereof. Modifications of a course of conveying lines often can only be realized with difficulties and great efforts.

Further, conveyor systems are known, components of which are formed modularly and portably. A good example is represented by portable belt conveyors. Several belt conveyors are set up one after the other to form a conveying line. Such belt conveyors respectively comprise a machine frame, a drive unit, a deflection pulley, a control device, and a (transport) belt, which is self-contained, as transport means. The deflection pulleys are supported rotatably in the machine frame at ends of the belt conveyor which are arranged upstream and downstream. The self-contained belt is mounted onto the deflection pulleys and moved endlessly rotating by means of the drive unit. The control device is in communication with the drive unit which in turn is in communication with, for example, one of the deflection pulleys for controlling a transport velocity, a transport direction, and the like. Linear conveyors (e.g., EP 1 474 347 B1) and curved conveyors (e.g., EP 1 529 008 B1) are known which are stringed together for mapping a desired course of lines. The machine frames are typically waist-high and comprise legs standing on a bottom of the hall. Further, modular portable roller conveyors are known which are structured analogously.

These conveyor modules are portable so that the system, i.e., each of the modules forming the course of lines, can be disassembled at any time and re-assembled at another location. For assembling the system at another location preparing measures need to be taken at the other location. Since corresponding systems are typically used in-house, for example, a corresponding factory hall needs to be constructed at first. The bottom of the factory hall needs to be leveled in accordance with the requirements of the system and needs to comprise a required payload capacity. Typically, these requirements require the reconstruction of a factory hall. Reconstruction in turn typically lasts several months. This means that despite a modular construction of the conveyor the installation (set-up) of the system requires a preparation phase, which lasts several months until the actual startup procedure. Typically, this time is not available for operators of corresponding systems. In particular, in the field of e-commerce such long periods of time cannot be accepted.

Another drawback of such a modular conveyor system is to be seen in that the modules can only be connected to each other, despite the transport capability thereof, on site and can only be tested on site with regard to proper functioning of the entire system. The modules need to be wired to each other on site. As far as control is concerned addressing the conveyor segments is typically performed on site only. The wiring is time-consuming. The addressing process is fault-prone and time-consuming for the IT specialists.

The document US 2009/0277749 A1 discloses a modularly constructed production line including an overhead conveyor. The document DE 601 30 048 T2 discloses a storage and retrieval system comprising a modular conveyor. The document U.S. Pat. No. 4,905,363 A discloses a modular process for disassembling light vehicles. The document WO 2006/103348 A1 discloses a device for conveying isolated goods.

Modularly constructed systems are actually known only in the context of conveyors standing on the ground. In general, modularly constructed overhead conveyors do not exist, in particular no portable overhead conveyors exist. Overhead conveyors are installed on site on a ceiling of a building or on supporting devices (constructional steel work, platform, etc.). During construction of a factory hall, the ceiling needs to be prepared correspondingly for the overhead conveyor. Contrary to the ground-based conveyors, an overhead conveyor cannot be set-up easily. The overhead conveyor needs to be suspended from the ceiling. Not every factory hall is provided with provisions allowing suspending of the hanging conveyor.

Therefore, it is an object of the present invention to provide a portable conveyor system which can be assembled and disassembled in short time and can be started-up immediately after the assembly. In particular, a corresponding overhead conveyor system is to be provided.

SUMMARY OF THE INVENTION

According to a first aspect of the invention it is disclosed a portable conveyor system having a modularly constructed conveyor, in particular a modularly constructed overhead conveyor, and a plurality of transport modules each formed of a plurality of previously installed and previously tested conveyor components, wherein the modules are arranged directly adjacent next to each other and/or on top of each other for commonly forming the system in a state where they are connected to each other, wherein the conveyor comprises: a plurality of conveying lines commonly forming, with regard to material flow, a previously defined course of conveying lines, wherein each of the conveying lines comprises a separate machine frame; at least one drive unit; at least one control device; and transport means movable along the course of conveying lines by the at least one drive unit in order to transport load supports, preferably hanging hangers, bags or trolleys, through the system; and wherein each module comprises: a standardized exterior dimension; a support structure, a dimension of which is adapted to the standardized exterior dimension; and at least one of the conveying lines, wherein the machine frame of each of the conveying lines is connected permanently to the support structure.

According to a second aspect of the invention it is disclosed a portable conveyor system comprising a modularly constructed conveyor and a plurality of transport modules, wherein each of the modules is formed of a plurality of previously installed and previously tested conveyor components, wherein the modules are arranged at least one of directly adjacent next to each other and on top of each other for commonly forming the system in a connected state, wherein the conveyor comprises: a plurality of conveying lines commonly forming, with regard to material flow, a predefined course of conveying lines, wherein each of the conveying lines comprises a separate machine frame; at least one drive unit; at least one control device; and a transport device movable along the course of conveying lines by the at least one drive unit in order to transport load supports through the system; and wherein each of the modules comprises: a standardized exterior dimension; a support structure, a dimension of which is adapted to the standardized exterior dimension; and at least one of the conveying lines, wherein the machine frame of the at least one of the conveying lines is connected permanently to the support structure.

The standardization of the external dimensions of the modules allows assembly and disassembly of the system in accordance with a kit principle. Each of the modules has the same size and a size thereof orientates at a uniform grid of sizes, similar to containers in international freight traffic. The modules can be installed previously. In particular, the conveyor can be attached to the support structure in advance. This in turn allows a previous functional check so that the modules only need to be connected to each other on the site of the system operator, and subsequently the entire system can be started-up immediately.

The modular construction allows arbitrary scaling of the system. The system can be extended at any time and modified with regard to functionality thereof by adding, removing, or exchanging individual modules. Defective modules can be ex-changed.

The modularly constructed system can be set-up at arbitrary locations, both inhouse a goods distribution warehouse and outside thereof, for example, on adjacent parking slots or fields. The construction of a separate warehouse is not required.

The system can be started-up in short time. The modules can be manufactured by the module manufacturer in great numbers in advance and can be stored in advance, allowing reaction and delivery immediately in response to an inquiry of a system operator.

The system can be assembled and disassembled temporarily for absorbing order peaks (e.g. Christmas business). The system can be rent or leased. This is advantageous for the manufacturer of the system, in particular since the system can be used again. The individual modules can be used later in other systems as well.

Each conceivable functional type (e.g., sorting, transporting, loading, unloading, etc.) within a conveyor system can be mapped by means of a special module. A system layer can be designed by the system operator on his/her own in that the system operator merely presets parameters defining the conceptual frame (e.g., parts/hours, number of loading stations, number of packing stations, spatial limitation, etc.). A corresponding design software then determines the required modules, which can be arranged by the system operator arbitrarily in dependence on specific categories.

With a particular embodiment each of the modules comprises at least one spatially standardized conveyor interface, wherein each of the conveyor interfaces is adapted to couple, with respect to material flow, to another spatially standardized conveyor interface of a module arranged directly adjacent.

Due to the standardization of the locations, where conveyor interfaces can be provided at all in relation to the modules, different functional types of the modules can be combined, without problems with regard to layout design, and can then later be physically connected actually on the construction site.

Further, it is preferred to define the spatially standardized conveyor interfaces along the uniform grid.

In particular, each of the modules comprises at least one spatially standardized support-structure interface, wherein each of the support-structure interfaces is adapted to be mechanically connected to a corresponding support-structure interface of a module being arranged directly adjacent.

Due to the standardization of the locations, where directly adjacent modules can be connected to each other, the modules of the system can be set up fast and connected to each other safely. The connection is simple and can be realized by a few flicks of the wrist. The design of the system layouts is simplified.

Further, each of the modules can be adapted to be transported by means of mass-transportation means from a site of a system operator to another site the system operator.

Visually speaking, the module of the invention allows transportation of a conveyor component within a separate building (support structure). The building of the entire conveyor system is then assembled on site similar to a prefabricated house. Parts of the building can be transported by means of ships, aircraft, trucks, or other mass-transportation means simply from one site to another remotely located site. Existing technologies for moving the modules can be utilized (e.g., container stackers, twistlocks, etc.).

With another particular embodiment each of the modules comprises at least one conveyor input and/or at least one conveyor output.

This expresses the grid-like character of the course of the conveying lines. The modules can be combined for mapping a self-contained circuit. The modules can also be combined to each other for being coupled, in terms of an open loop, to an existing system in terms of a system extension.

Preferably, the exterior dimension of the module corresponds to an exterior dimension of a standardized large-capacity container, particularly to the exterior dimension of an ISO container.

Further, it is advantageous if the support structure defines a parallelepiped, wherein the support structure comprises: longitudinal struts; transversal struts; and vertical struts; and wherein the parallelepiped comprises: a top side and a bottom side, which are arranged oppositely in a vertical direction of the module; first and second front sides being arranged oppositely to each other in a longitudinal direction of the module; and first and second longitudinal sides being arranged oppositely in a transversal direction of the module.

By adapting the sometimes imaginary contours of the modules to a parallelepiped, the modules can be added, like building blocks, to an overall formation. The modules can preferably comprise the shape of a cube, or ashlar which represents preferably an integer multiple of the cube.

With a preferred embodiment, the support structure comprises a base frame formed by longitudinal struts, transversal struts, and vertical struts, which are connected to each other permanently and spatial positions of which correspond to some, preferably all, edges of a parallelepiped.

The base frame is particularly stable with this selection of (installation) locations for the struts, and is particularly torsion-resistant. The base frame defines kind of an outer frame, in the interior of which the conveyor components can be installed safely. The support structure preferably acts as an outer protection shell.

Preferably, at least the base frames of the modules are formed identically.

This limits the variety of the construction kit slightly, but simplifies the manufacturing of the modules significantly since only one type of prefabricated construction elements is used.

Further, it is advantageous if the base frame comprises container corners being arranged preferably in corners of the parallelepiped.

The container corners allow a (freight) container-like handling of the module. Existing container-transport technologies can be utilized for transporting and moving the modules.

With another particular embodiment the support structure comprises additional support struts connected to the base frame along the uniform grid.

The support struts are spatially connected to the base frame, preferably dependent on the course of the lines. In this case the support struts are arranged along the uniform grid. The arrangement of the support struts, in particular when an overhead conveyor technology is used, results in that the conveyor line runs along the uniform grid. If the conveyor line runs along the uniform grid, the conveyor line also ends, or begins, along the uniform grid. The conveyor interface is then arranged along the uniform grid.

The support struts being arranged along the grid can be connected at different locations to the struts of the base frame. A system designer is free in designing the course of the conveying lines. The conveying line is always supported optimally.

Preferably, the base frame comprises a plurality of receiving devices, wherein each of the receiving devices is adapted to receive a support strut, preferably in a releasable manner, and wherein each of the receiving devices is arranged at an imaginary intersection of the uniform grid with the base frame.

In this case, the support struts, for example, can be inserted into the base frame. After successful utilization within a first system, the respective module can be converted in a simple manner for being used in another system, in particular for a different functional purpose. Change of the course is possible without problems.

In particular, the sides of the parallelepiped, and the sides of the support structure, can be closed by means of removable walls.

This simplifies transport of the modules. The modules can be closed for the transport. Individual sides of the module can be removed during the operation within the system. Other sides can be inserted during the operation of the system for separation against the environment.

With another particular embodiment the conveyor comprises at least one of the following conveyor components: at least one guiding rail, a ceiling holder, a control device, a drive unit, a switch, a stopping device, a wiring, and/or a sensor.

The above-mentioned conveyor components are particularly required for the realization of an overhead conveyor.

Further, a conveyor clutch can be provided, which is adapted to mechanically connect conveyor interfaces of modules to each other, which are arranged directly adjacent.

Preferably, each of the modules represents a functional type selected of a group which comprises at least one of the following functional types: a workstation for, preferably manually, loading/unloading load supports; a buffer for temporarily storing the load support; a sorting device for sequencing the load supports in accordance with a predetermined sequence; and a transport line for moving the load supports along straight elements and/or curved elements.

According to a third aspect of the invention it is disclosed a portable transport module for being installed in a conveyor system which comprises a modularly constructed conveyor and a plurality of modules, wherein the modules of the system can be arranged directly adjacent next to each other and/or on top of each other for commonly forming the system in a connected state, and wherein the portable module comprises: a plurality of previously installed and previously tested conveyor components forming at least one conveying line which is part, with regard to material flow, of a previously defined course of conveying lines; a standardized exterior dimension; and a support structure, dimension of which is adapted to the standardized exterior dimension; wherein each of the conveying lines is connected permanently to the support structure.

According to a fourth aspect of the invention it is disclosed a portable transport module configured for being installed in a conveyor system, the conveyor system comprising a modularly constructed conveyor and a plurality of modules, wherein the modules of the system can be arranged at least one of directly adjacent next to each other and on top of each other for commonly forming the system in a connected state, and wherein the portable module comprises: a plurality of previously installed and previously tested conveyor components forming at least one conveying line which is part, with regard to material flow, of a predefined course of conveying lines; a standardized exterior dimension; and a support structure, dimension of which is adapted to the standardized exterior dimension; and wherein each of the conveying lines is connected permanently to the support structure.

It is clear that the above-mentioned and hereinafter still to be explained features cannot only be used in the respectively given combination but also in other combinations, or alone, without departing from the scope of the present invention.

BRIEF DESCRIPTION OF THE DRAWINGS

Embodiments of the invention are illustrated in the drawings and will be explained in the following description in more detail, wherein.

DESCRIPTION OF PREFERRED EMBODIMENTS

In the following description of the figures the present invention will be described exemplarily with regard to an overhead conveyor. However, it is clear that the present invention is not limited to this specific type of conveyor only. The present invention, among other things, can also be applied to belt conveyors, roller conveyors, chain conveyors, or similar conveyors.

Figures 1A, 1B:
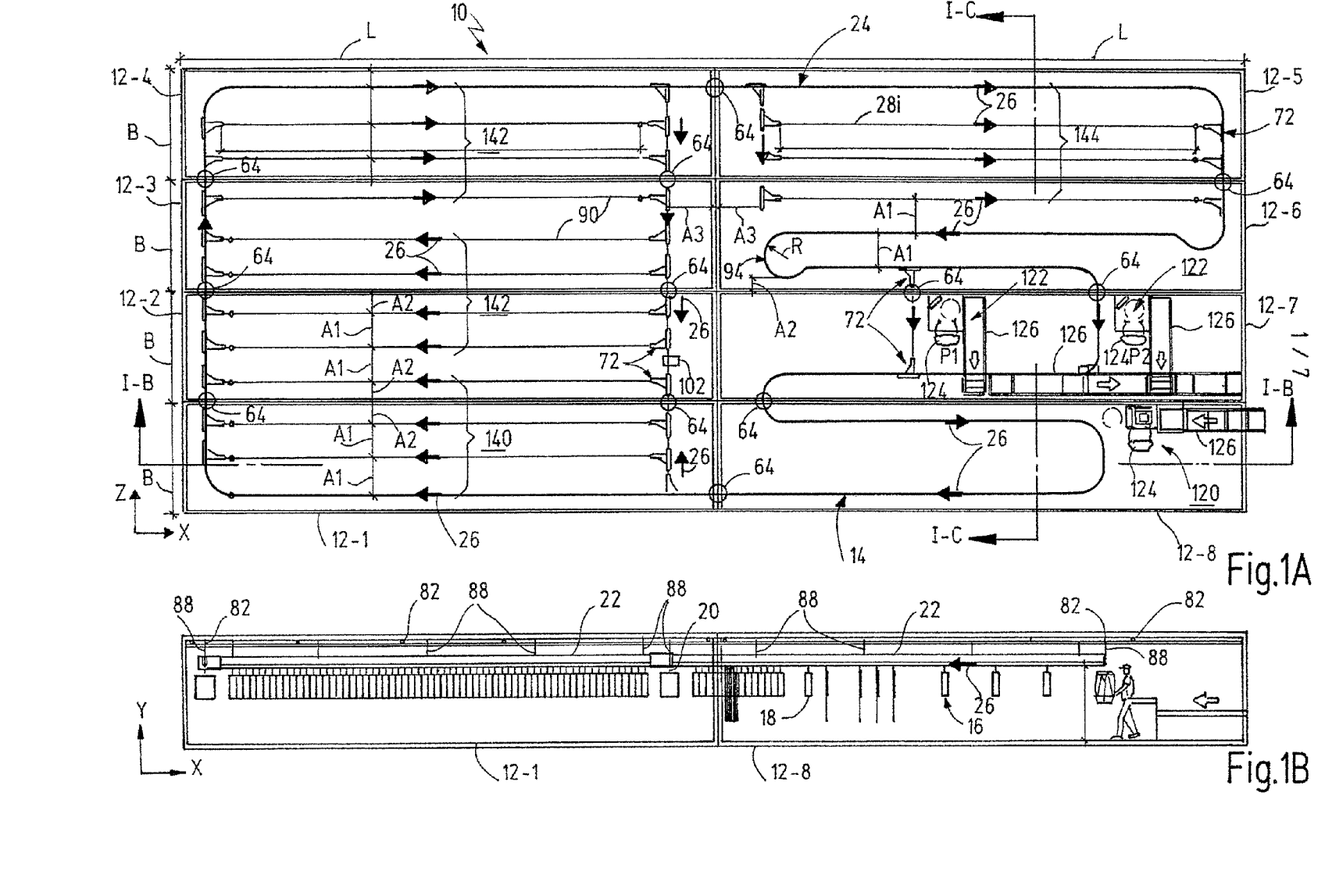
FIG. 1A shows a top view of a modularly constructed (overhead) conveyor system in accordance with the invention.
FIG. 1B shows a first side view of the conveyor system along a line I-B in FIG. 1A.
Figures 1C, 9A, 9B:
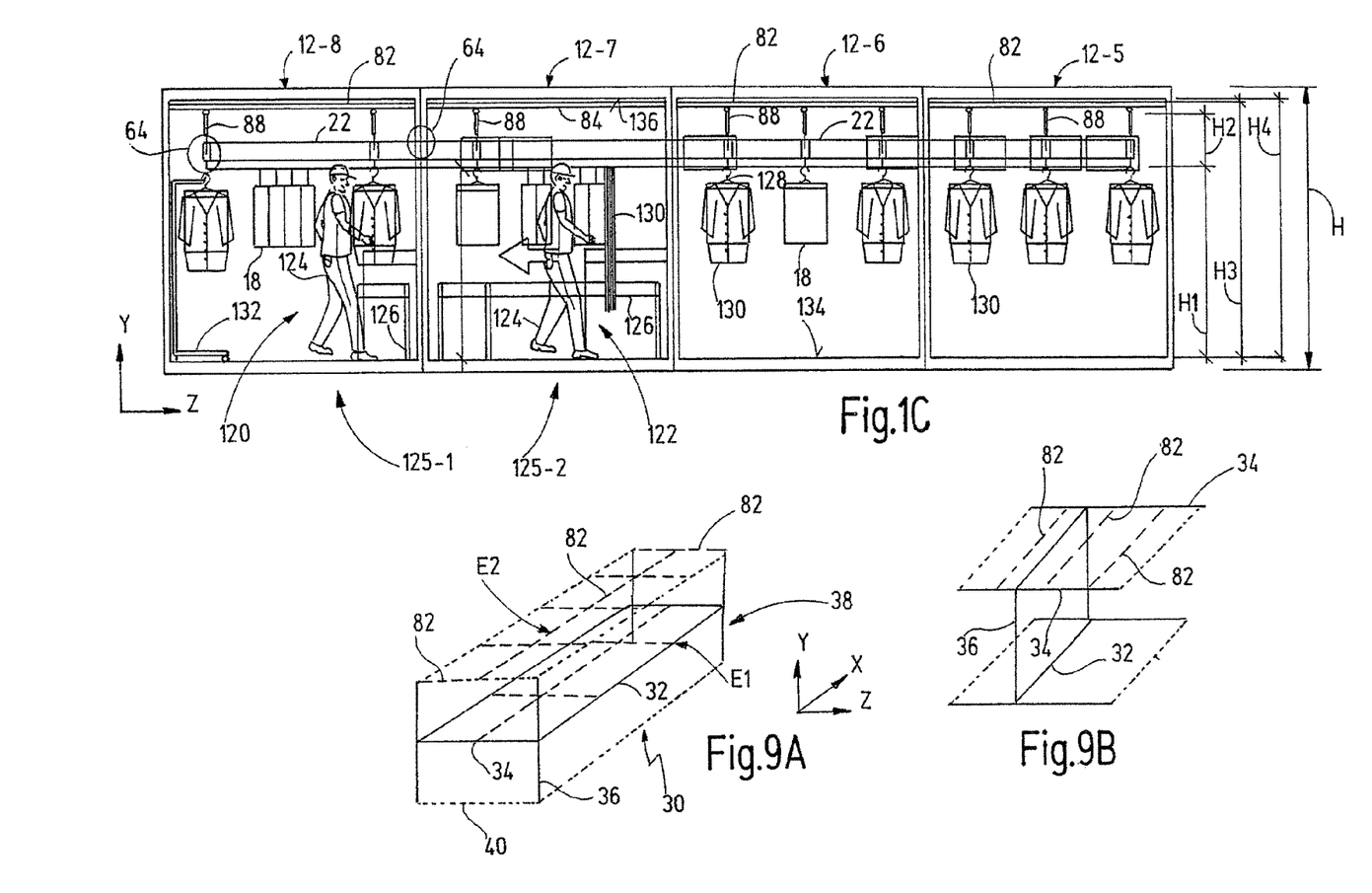
FIG. 1C shows another side view of the conveyor system along a line I-C in FIG. 1A.
FIGS. 9A and 9B show perspective views of modified support structures.

FIGS. 1A-C show different views of an (overhead) conveyor system (hereinafter briefly designated as "system") 10. FIG. 1A shows a top view of the system 10. FIG. 1B shows a sectional view along a line I-B in FIG. 1A, wherein a longitudinal side of the system 10 is shown. FIG. 1C shows a sectional view along a line I-C in FIG. 1A, wherein a front side of the system 10 is illustrated in a perpendicular direction. The illustrations of FIGS. 1A and 1B are referenced hereinafter.

In general, a system 10 comprises several transport modules (hereinafter also briefly designated as "modules") 12. In FIG. 1A eight modules 12-1 to 12-8 are exemplarily shown which are connected to each other in a 2×4 array for forming the entire system 10. The modules 12-1 to 12-4 are arranged on the left. The modules 12-5 to 12-8 are arranged on the right. The modules 12-1 to 12-8 are arranged in one plane. It is clear that the modules 12 might also be arranged on top of each other in several planes. Further, it is clear that the modules 12 do not need to be arranged regularly. For example, the modules 12-7 and 12-8 can be omitted so that a regular rectangular base area (rectangle) does not result. The modules 12 are arranged along a regular (module) size grid (e.g., base area of one module 12) as will be explained in more detail below.

Each of the modules 12 comprises at least parts of an (overhead) conveyor (hereinafter also briefly designated as "conveyor") 14. Load supports 16 such as bags 18 (FIG. 1B) or hangers 128 (FIG. 1C) can be transported in a hanging manner by means of the conveyor 14. Overhead conveyors are used, for example, in the clothing industry for in-house transport of garments. The garments can be transported in a hanging manner or lying manner. If the garments are transported hangingly on hangers 128, these are called hanging goods 130 (FIG. 1C). The garments are transported in a lying manner, the bags 18 are utilized. These are called lying goods which are put into the bags 18. However, a load support 16 can also be realized, for example, by a so-called "trolley". A trolley is kind of a vehicle movable on a running rail and onto which goods or loads can be hanged. Often, platforms are hung onto travelling carriages for transporting heavy and unwieldy piece goods in a hanging manner.

The bags 18 comprise a hook 20 for being transported hangingly beneath a horizontally arranged guiding rail 22 of the conveyor 14. The guiding rail 22 serves for receiving transport means (e.g. a chain), which is not depicted here and which is moved rotatingly along a conveyor course 24. In case of a belt conveyor the transport mean were to be realized by a belt. The bags 18 are hanging on tappets, which are not shown and not designated in further detail here and which in turn are connected to the transport means. In FIG. 1A the course 24 is indicated by means of a dark line and extends substantially in an outer periphery through each of the eight modules 12-1 to 12-8. The course 24 is self-contained in the example of FIG. 1A. The course 24 can be formed open. In this case, the course 24 starts at an input, which is not shown and not designated in further detail here, and ends at an output, which is not further shown and not designated here. The input and the output represent physical interfaces to the environment of the system 10. In this manner it is possible to set up the modularly constructed system 10, for example, on a parking space adjacent to an existing production facility for connecting the system 10 with another system which already exists within the production facility. The modules 12 are preferably formed like (freight) containers with regard to the dimension thereof, and are compatible to containers.

Each of the modules 12 can be implemented in terms of a standardized (ISO 668) large-capacity container. Each of the modules 12 preferably has a width of 8 feet, and can be, for example, 20 or 40 feet long. A (module) size grid (8×20 feet), which is defined correspondingly, is compatible to the unit of measure "TEU" (Twenty-foot Equivalent Unit) or "FEU" (Forty-foot Equivalent Unit). The modules 12 can be secured by so-called twistlocks and lashing rods/tensioning screws 26 on a deck of a ship, within a cargo hold of an aircraft, on a loading platform of a truck, or to another mass-transportation means. As will be explained hereinafter with reference to FIGS. 3 and 4 in more detail, the modules 12, and the frames thereof, are preferably made of steel at a large part. A frame of the modules 12 is particularly constructed of stable steel parts. Each of the modules 12 can fulfill another conveying function (e.g., conveying, accumulating, buffering, sorting, loading, unloading, etc.). Each of the modules 12 is already completely installed and utilized directly at the location of a system operator without installation works and tests.

Returning to FIG. 1A, the load supports 16 substantially rotate clockwise through the system 10 as shown by means of dark arrows 26 which indicate the respective conveying direction. The course 24 substantially extends along outer edges of the system 10. However, the load supports 16 can be guided within individual (functional) modules 12 to branches and circulate there, as it will be explained in further detail hereinafter. In the present case the self-contained course 24 starts, for example, in the module 12-8, changes into the module 12-1, and is guided there via the modules 12-2, 12-3, and 12-4 into the module 12-5. From there the course 24 continues to the modules 12-6 and 12-7 for arriving again at the starting point within the module 12-8. The functional types of the individual modules of the system 10 of FIG. 1A will be explained in more detail below.

Figure 2:
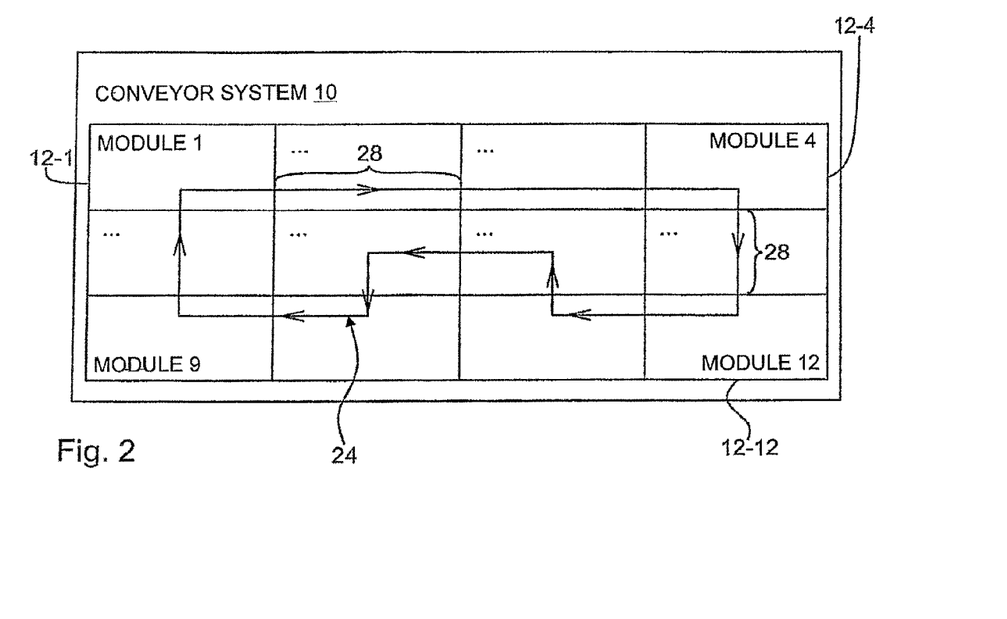
FIG. 2 shows a block diagram of a modularly constructed conveyor system of the invention.

FIG. 2 shows an abstract block diagram of a conveyor system 10, in the present case exemplarily comprising twelve modules 12-1 to 12-12 in a 3×4 array. The course 24 of FIG. 2 consists of twelve conveying lines 28, wherein each of the conveying lines 28 extends through one of the modules 12-1 to 12-12. The course 24 in turn is self-contained.

Figure 3:
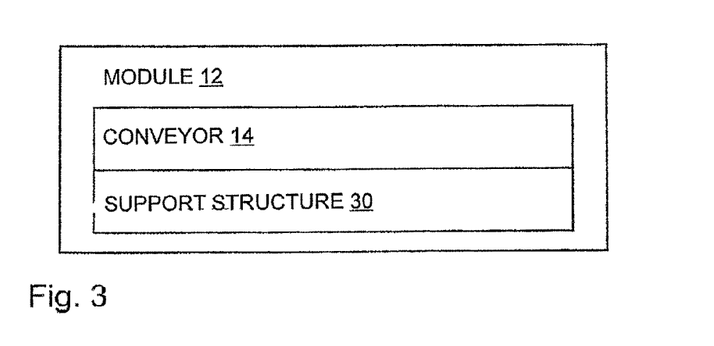
FIG. 3 shows a block diagram of a (transport) module of the invention.
Figure 4:
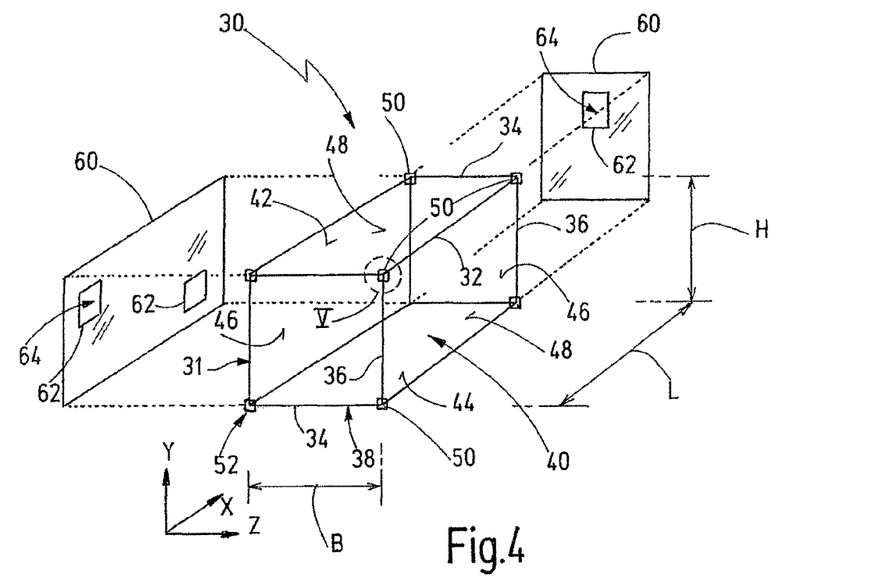
FIG. 4 shows an exploded view of a module.

Each of the modules 12 generally comprises one conveyor 14 as well as one support structure 30, as schematically shown in the block diagram of FIG. 3. In FIG. 4 an exemplary support structure 30 is illustrated in an exploded view. The support structure 30 defines a (transport) frame provided separately to the frames belonging to the conveyor 15. The frames of the conveyor 14 are fixed in this sense to the frame of the support structure 30. The frames of the conveyor 14 are not shown in FIG. 4. FIG. 4 only shows the frame of the support structure 30.

The support structure 30 of FIG. 4 comprises longitudinal struts 32, transversal struts 34, and vertical struts 36. The longitudinal struts 32 are orientated parallelly to a longitudinal direction X. The transversal struts 34 are oriented parallelly to the transversal direction Z. The vertical struts 36 are oriented parallelly to a height direction Y. The longitudinal direction X, the transversal direction Z, and the height direction Y define in the present case a Cartesian coordinate system. The longitudinal struts 32, the transversal struts 34, and the vertical struts 36 define a base frame 38 of the support structure 30 and the module 12.

The base frame 38 in turn defines a parallelepiped 40. A parallelepiped is a geometrical body being limited by six paired congruent (matching) parallelograms lying in parallel planes. The parallelepiped 40 comprises twelve edges 31, respectively four of which extend in parallel and which have an identical length. The parallelepiped 40 of FIG. 4 is an ashlar, all angles of which respectively have 90° between the struts 32, 34, and 36. The ashlar and the cube represent preferred shapes of the parallelepiped which is presently used. It is clear that the vertical struts 36 do not need to be orientated necessarily perpendicular. The longitudinal struts 32 and the transversal struts 34 are here orientated horizontally. The struts 32, 34, and 36 are fixedly connected to each other. If the struts 32, 34, and 36 are made of steel, for example, they can be welded to each other for providing a stable and load-bearing module frame.

With one variation the support structure 30 and the base frame 38 are formed open. This means that a top side 42, a bottom side 44, front sides 46, which are arranged oppositely in the longitudinal direction X, and longitudinal sides 48 of the parallelepiped 40, which are arranged oppositely in the transversal direction Z, are formed open. The longitudinal struts 32 and the longitudinal sides 48 have a length L (e.g., 20 feet or 40 feet). The transversal struts 34 and the front sides 46 have a (uniform) width B (e.g., 8 feet). The vertical struts 36 have a length corresponding to a height H (e.g., 2,591 m or 2,896 m). An (exterior) dimension of one module corresponds to an (outer) dimension of the support structure 30, or the base frame 38. Even if the struts 32, 34, and 36 are not arranged at each location of the edges 31 of the parallelepiped 40, the struts 32, 34, and 36 nevertheless define a parallelepiped (cf. FIGS. 9A and 9B).

Hence, the modules 12 are preferably adapted to the uniform size grid of ISO (freight) containers, and in particular are compatible thereto. The support structure 30 and the external dimension correspond in this case to the dimension of an ISO container. It is clear that the module 12, or the support structure 30, can also lean on a different uniform size grid. The modules 12 and the support structures 30, for example, can be selected in size such that the modules 12 and the support structures 30 can be transported for the sake of transport from one site of a system operator to another site within a conventional container.

Figure 5:
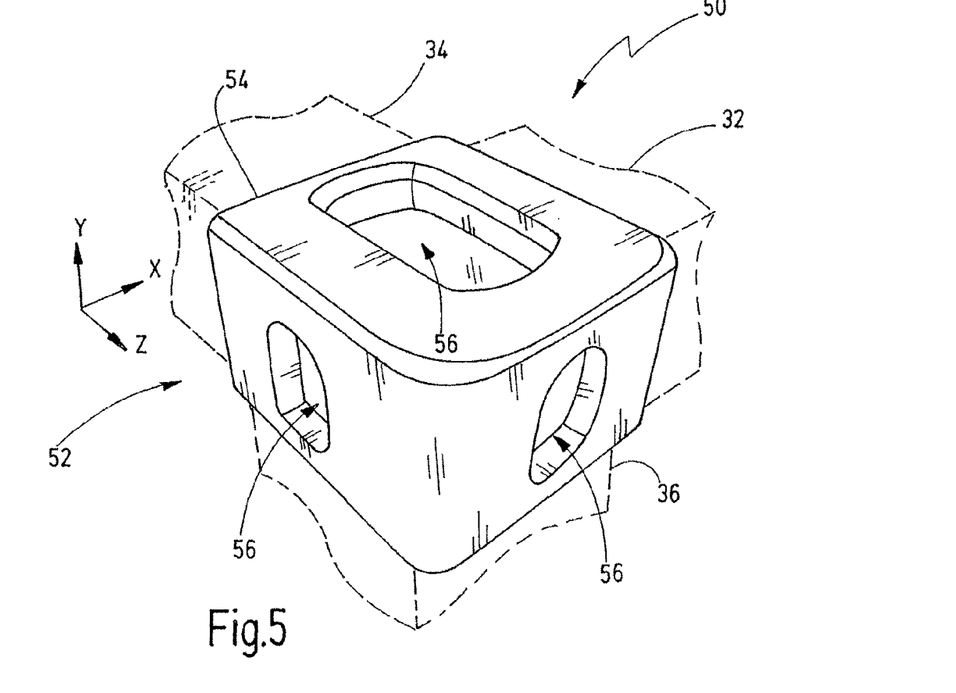
FIG. 5 shows a perspective enlarged view of a container corner of FIG. 4.

The support structure 30 of FIG. 4 can be provided in the corners of the parallelepiped 40, where the struts 32, 34, and 36 meet each other, with so-called container corners 50. One of the container corners 50 of FIG. 4 is surrounded by a circular line V. FIG. 5 shows this container corner 50 of FIG. 4 enlarged. The container corners 50 represent interfaces 52 of the support structure 30. The support-structure interfaces 52 serve for securing loads during transport of the module 12. The support-structure interfaces 52 can also serve for securing a position within the entire system 10 (cf. FIGS. 1A-C) by mechanically connecting direct adjacent modules 12 to each other via the interfaces 52. It is clear that the interfaces 52 do not need to be arranged necessarily in the corners of the parallelepiped 40. The interfaces 52 are preferably arranged long the struts 32, 34, and 36. However, the interfaces 52 can also be arranged within the volume of the parallelepiped 40. The interfaces 52 are preferably connected fixedly to the base frame 38.

FIG. 5 shows a perspective view of the upper right front corner of the support structure 30 of FIG. 4. The struts 32, 34, and 36 are indicated by dashed lines. The container corner 50 is ISO standardized and adapted to interact with, for example, twistlocks and lashing rods/tensioning screw connections. The container corner 50 can be formed integrally with one of the struts 32, 34 or 36. For example, the container corner 50 can be casted.

The container corner 50 preferably comprises openings 56 which are orientated for being connected to direct neighbors (modules 12 or container corners 50 thereof). In FIG. 5 the openings 56 are orientated along the main axis of the Cartesian coordinate system XYZ.

It is clear that the support-structure interfaces 52 can also be realized in different types. The interfaces 52 can be formed, for example, such that direct adjacently arranged modules 12 can be connected to each other through a tongue and groove connection, i.e. form-closed instead of frictionally connected. The mechanical connection of direct adjacent modules is then effected by merely moving the modules 12 together.

Returning to FIG. 4, the open sides 42-48 of the support structure 30 can be closed by correspondingly sized walls 60. The walls 60 are preferably formed releasable, so that the walls 60 are connected to the support structure 30 only during transport. Individual ones or each of the walls 60 can be removed during operation of the system 10. In case that the modules 12 are arranged only within one single plane, i.e. arranged next to each other, the top side 42 and the bottom side 44 are typically formed (permanently) in a closed manner in terms of a ceiling and a bottom. The side walls 46 and 48 are then typically formed in a removable manner. In case that the modules 12 are arranged on top of each other in several planes, the ceilings and/or bottoms between vertically adjacent modules can be omitted, particularly if the course comprises upward and downward inclinations for bridging different planes. Alternatively, openings 62 can be provided in the walls 60 (functionally) representing conveyor interfaces 64. In this case the walls 60 can rest permanently between directly adjacent modules 12. The openings 62 can be formed in terms of man holes, i.e., can comprise, for example, a removable cap.

As will be explained in further detail below, the conveyor interfaces 64 are arranged in a spatially standardized manner. Hence, the conveyor 14 does not enter the respective module 12 at an arbitrary location, or exit the respective module 12 at an arbitrary location. The entrance and the exit occur at locations which are located along a standardized grid (preferably along imaginary grid points of a grid structure). Such a grid will be explained in further detail with reference to FIG. 7. Not only the conveyor interfaces 64 are orientated along this standardized grid but, for example, also the course 24 and the dimensions of the modules 12, and in that term there exists only one single uniform size grid along which, among other things, the modules 12, the support structure 30, the course 24, the support-structure interfaces 52, and the conveyor interfaces 64 orientate. Thus, the system 10 can be assembled and disassembled in accordance with a kit principle, similar to Lego bricks.

FIG. 6 once again shows a block diagram of the structure of the modules 12. The module 12 defines the parallelepiped 40 by the support structure 30, or the base frame 38. The support structure 30 comprises the struts 32, 34, and 36 as well as optionally the container corners 50 and the walls 60. Besides the support structure 30, the parallelepiped 40 is defined by the sides 42 to 48. The support structure 30 can also comprise additional support struts 84 which will be described in further detail with reference to FIG. 7.

Figure 6:
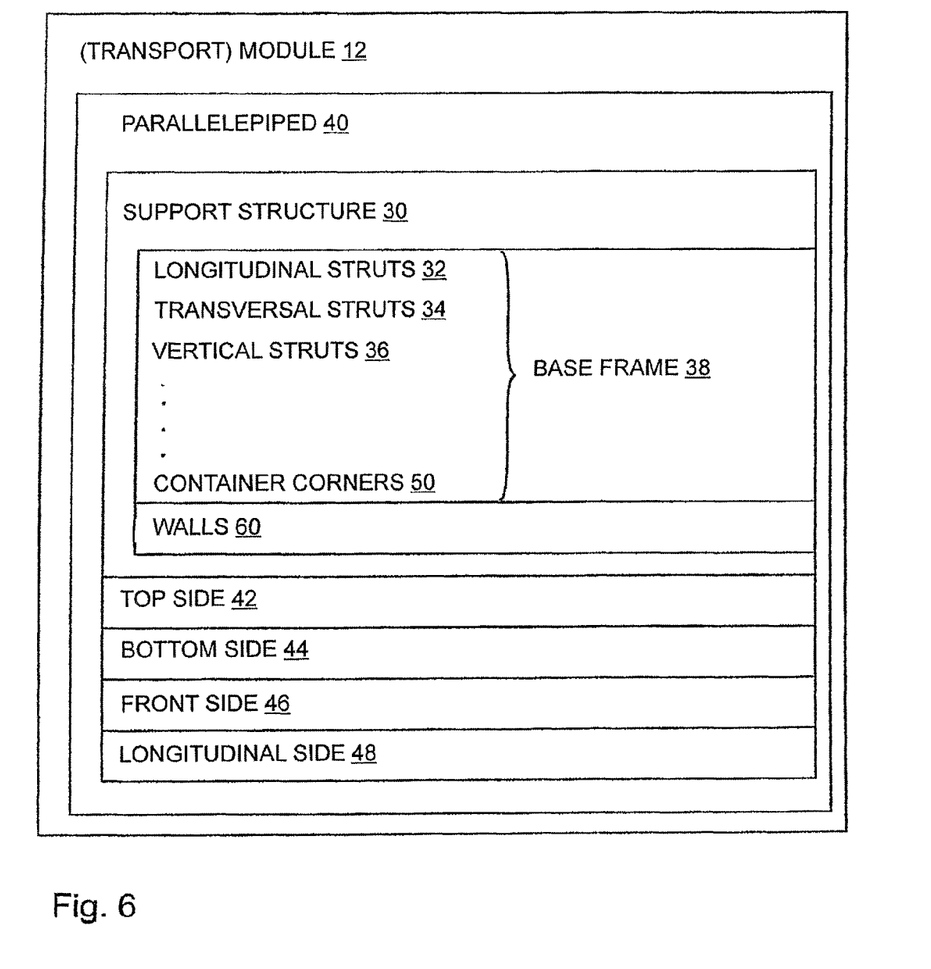
FIG. 6 shows another block diagram for a module of the invention.

The conveyor 14, which is not shown in FIG. 6, will be explained in more detail with reference to FIG. 8.

Figure 7:
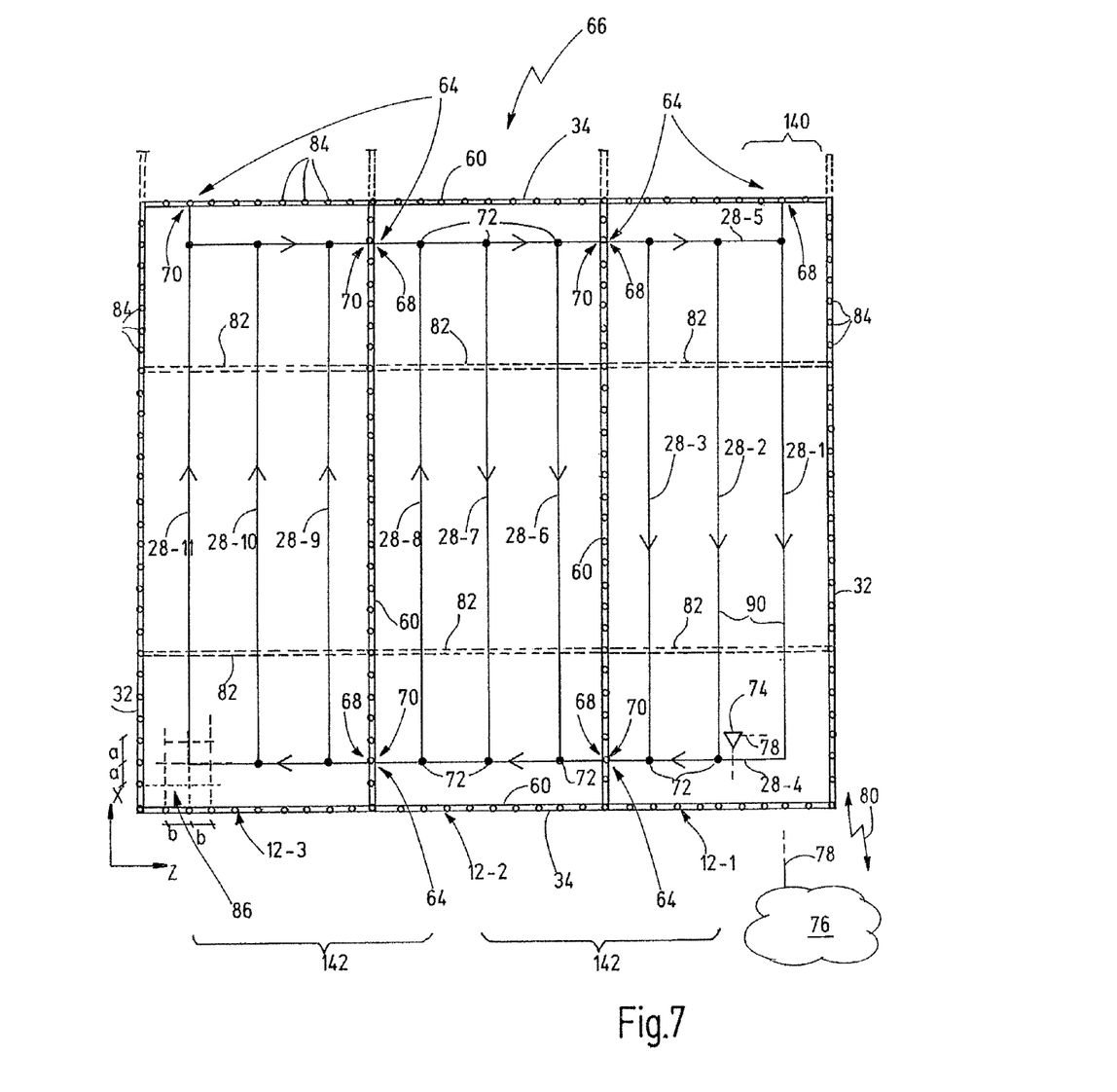
FIG. 7 shows a top view of three modules of an overhead conveyor system.

FIG. 7 particularly serves for illustrating a further uniform (size) grid. FIG. 7 shows a top view of three modules 12-1 to 12-3 arranged directly adjacent to each other in the transversal direction Z and being connected to each other. The modules 12 of FIG. 7 respectively comprise the base frame 38 of FIG. 4.

The modules 12-1 and 12-3 respectively comprise three conveyor interfaces 64. The center module 12-2 comprises four conveyor interfaces 64. The conveyor interfaces 64 of the adjacent modules 12 are located directly opposite to each other and are connectable to each other by means of a conveyor clutch which is not shown in further detail. The conveyor interfaces 64 comprise in this sense a spatial area, within which the conveyor 14 of the module 12 starts and/or ends, as well as corresponding conveyor components.

Some conveyor interfaces 64 of a sorting device 66 shown in FIG. 7 only serve as conveyor input 68, as conveyor input 68 and conveyor output 70, or merely as conveyor output 70. The general input of the modules 12-1 to 12-3 happens through the conveyor input 68 of the module 12-1 which is shown on the upper right. This conveyor input 68 represents an upstream end of a first (straight) conveying line 28-1. The module 12-1 of FIG. 7 comprises two additional conveying lines 28-2 and 28-3 extending in parallel to the conveying line 28-1 in the longitudinal direction X. The conveyor lines 28-2 and 28-3 are arranged at a distance A1 (cf. FIG. 1A) relative to each other allowing transporting the load supports 16 in parallel next to each other (in the transversal direction Z). Since the FIG. 7 also shows an overhead conveyor 14, the drawn-in conveying lines 28 correspond to a course of guiding rails 22 which are not shown in further detail here. The three parallel conveying lines 28-1 to 28-3 are connected to each other by means of two additional conveying lines 28-4 and 28-5 extending in the transversal direction Z. The modules 12-2 and 12-3 are similarly constructed like the module 12-1 with regard to the course. The modules 12-2 and 12-3 respectively comprise three additional conveying lines 28-6 to 28-11 extending in parallel along the longitudinal direction X. Further, the modules 12-2 and 12-3 respectively comprise two conveying lines which are not designated in more detail here extending in the transversal direction Z, and which connect to each other the respective ends of the conveying lines 28 extending in the longitudinal direction X. At the connection points switches 72 can be provided allowing feeding of and/or discharging the load supports 16.

The conveying line 28-1 functionally represents a pre-buffer 140. The conveying lines 28-2, 28-3, 28-6, and 28-7 represent a sorting stage 142 which can be passed by the load supports 16 in the negative direction X. The conveying lines 28-8, 28-9, 28-10, and 28-11 represent an additional sorting stage 142 which can be passed by the load support 16 in the positive direction X.

Further, one or more sensors 74 such as light barriers, reflective sensors, or the like can be provided allowing detection of the load-support stream at least close to junctions. In FIG. 7 a sensor 74 is shown in the module 12-1 which is arranged upstream relative to a downstream end of the conveying line 28-2. This sensor 74 allows to check whether the conveying line 28-2 is allowed to discharge one of the load supports 16 into the conveying line 28-2 or, in case of discharging, a collision with a load support 16 occurs, which originates from the conveying line 28-1. The sensor 74 is connected for this purpose to a central control device 76, or alternatively to several decentrally provided control devices (not shown). The control device 76 can be integrated into the modules 12 or can be arranged externally to the modules 12. The control unit 76 is indicated in FIG. 7 as a cloud. The control unit 76 and the sensor 74 can communicate with each other by means of solid lines 78 or wirelessly (cf. arrow 80). The connections 78 and 80 shown in the figure represent each of the connections between the control device 76 and actuators 98 (cf. FIG. 8) such as the switches 72.

In FIG. 7 six support struts 82 are exemplarily shown in terms of one double dashed lines extending along the transversal direction Z. For each module 12, for example, two support struts 82 are provided which are connected to connecting devices 84. The connecting devices 84 are realized, for example, in terms of recesses in the longitudinal struts 32 and in the transversal struts 34, which allow insertion of, for example, rod-shaped support struts 82 from above into the struts 32 and 34. The connecting devices 84 are indicated in FIG. 7 by means of circles and are arranged along a grid-like structured grid 86, which is indicated in the lower left corner of the module 12-3 in terms of imaginary grid lines. In the longitudinal direction X the grid lines have a grid constant a. In the transversal direction Z the grid lines have a grid constant b. In the direction Y the grid 86 can comprise a (not shown) grid constant c. If the grid constants a, b, and c are equal, the grid lines form a cube. This cube can represent a base unit for a regular (conveyor) size grid. The conveyor grid and the module grid are adapted to each other.

It is clear that the support struts 82 can be connected to each of the shown connecting devices 84. Support struts 82 having corresponding lengths can also be inserted in the longitudinal direction X into the transversal struts 34. The support struts 82 can be connected permanently to the struts 32 and 34 by welding the support struts 82, for example, to the struts 32 and 34. The support struts 82 are provided at locations which are predetermined by the course 24 (cf. FIG. 1A). Particularly, if an overhead conveyor 14 is used, the supporting struts 82 are arranged along the top side 42 of the modules 12, preferably directly above the course 24, for allowing the overhead conveyor 14 to be mounted hangingly. It is clear that the support struts 82 can also be provided in the area of the bottom side 44, or in the area of one of the other sides 46 and 48, for supporting different conveyor types.

Ceiling holders 88 are mounted to the support struts 82 shown in FIG. 7, as exemplarily shown in the side view of FIG. 1B. In FIG. 1B, also the position of the supporting struts 82 extending in the transversal direction Z are shown. The guiding rail 22 is mounted to the ceiling holders 88 of FIG. 1B. One or more drive units 102 can be attached to the guiding rail 22, wherein one exemplary drive unit 102 is shown in the module 12-2 of FIG. 1A.

Figure 8:
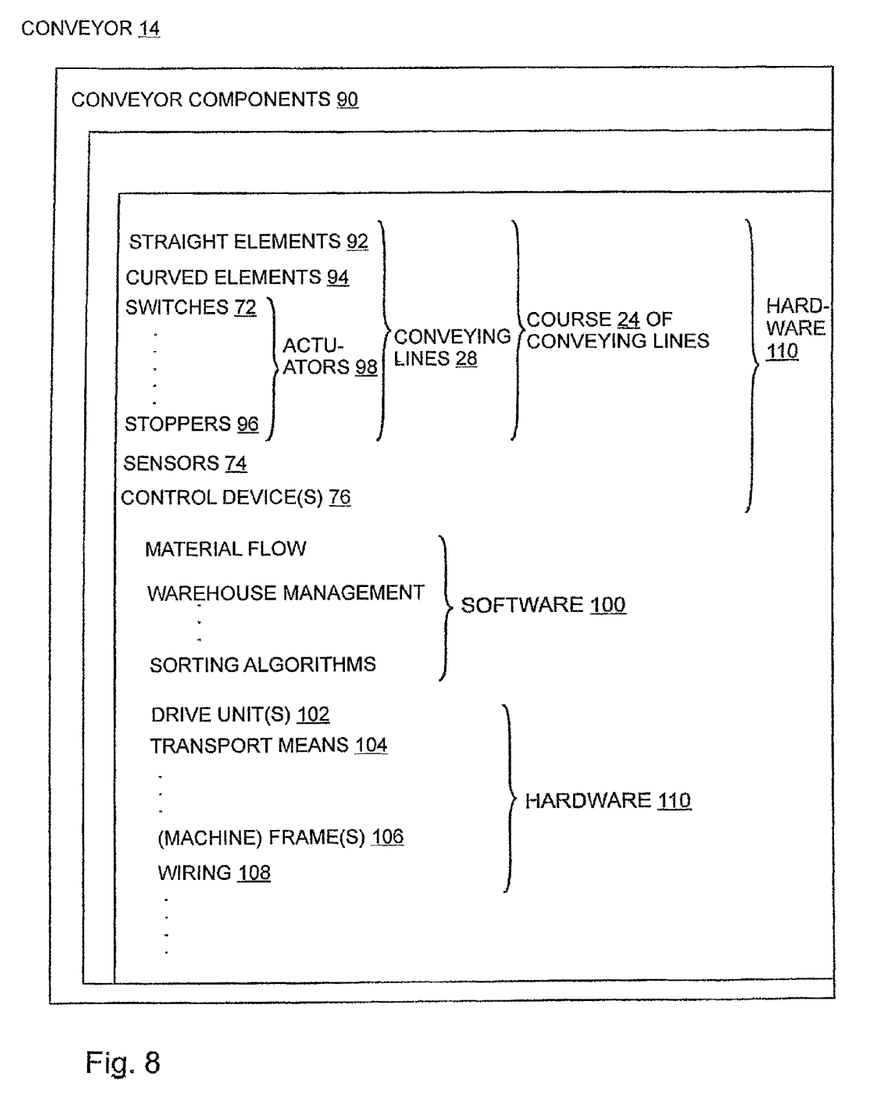
FIG. 8 shows a block diagram which shows a structure of a conveyor.

With reference to FIG. 8 the structure of the conveyor 14 will be explained by means of a block diagram. The conveyor 14 is formed by conveyor components 90. The conveyor components 90 can comprise one or more conveying lines 28, sensors 74, control devices 76, drive units 102, transport means 104, machine frames 106, wiring 108, and the like. The conveying lines 28 are typically formed by straight elements 92, curved elements 94, as well as actuators 98. The actuators 98 comprise elements such as switches 72, stoppers or stopping devices 96, and the like. The actuators 98 substantially serve for controlling a material flow. The entirety of all of the conveying lines 28 defines the conveyor course 24.

For allowing the actuators 98 to be actuated by means of the control de-vice(s) 76, sensors 74 are used, which provide information required for controlling the material flow, warehouse management, sorting algorithms, and the like. Barcode scanners and RFID scanners represent additional examples of the sensors 74. The material flow, the warehouse management, and the sorting algorithms are implemented, as a rule, in terms of software 100 which can be executed by the control device(s) 76 by means of programs. The drive units 102, the transport means 104, the frames 106, the wiring 108, the conveying lines 28, the sensors 74, and the control device 76 represent, in this sense, hardware 110. If the conveyor 14 is represented by an overhead conveyor 14, the transport means 104 can be realized in terms of a chain. If the conveyor 14 is a steady conveyor, the transport means 104 can be implemented by belts or rollers. In case of an overhead conveyor, the (machine) frames 106 are substantially implemented by the ceiling holders 88 and the guiding rail 22. In case of belt conveyors or roller conveyors, the frame 106 comprises frame-like sides including legs.

All of the electrical components of the conveyor 14 are connected electrically and with regard to data with each other by means of the wiring 108. The wiring of the electrical conveyor components 90 of conventional systems requires high time and work efforts. Since the modules 12 of the invention are previously installed and previously, in particular electrically, tested, the modules 12 are merely physically connected to each other and started up directly on site. The manufacturer of the modules 12 can completely assemble the system 10 in advance and test same with regard to the functionality thereof. Subsequently, the system 10 is disassembled at the manufacturer of the system 10, and transported to the customer of the system 10 for being assembled again and subsequently started-up immediately.

Returning to FIGS. 1A-C, the functional structure of the system 10 of FIGS. 1A-C will be explained below.

The module 12-8 comprises a receiving station 120 where the load supports 16 are loaded with goods. The module 12-7 comprises two packing stations 122 (cf. "P1" and "P2" in FIG. 1A, where the load supports are manually unloaded by staff 124 in accordance with picking orders as also shown in the side view of FIG. 1C. The receiving station 120 and the packing station 122 functionally present workstations 125. The receiving station 120 represents a first workstation type 125-1. The packing station 122 represents a second functional workstation type 125-2.

In the packing station 122 the hanging goods 130 can be taken from hangers 128 and can be put onto a steady conveyor 126 (e.g., roller conveyor or belt conveyor with or without containers or cartons provided thereon). The top view of FIG. 1A clearly shows that the steady conveyor 126 transports the unloaded goods away from the system 10 (cf. light arrows in the module 12-7). The steady conveyor 126 in the module 12-7 represents, with regard to material flow, a discharge line (output) of the system 10. The supply (input) of the system 10 occurs in the module 12-8 at the receiving station 120, where, for example, rolling carriages 132 (cf. FIG. 1C) including hanging goods 130 are provided for loading the load supports.

The system 10 of FIG. 1A consisting of eight modules 12 comprises, besides the workstations 125, a prebuffer 140 comprising four conveying lines 28. Downstream to the prebuffer 140 respectively two two-stage sorting stages 142 are shown commonly forming a sorting device. Downstream relative to the sorting device an afterbuffer 144 is provided which in turn comprises, for example, four conveying lines 28 adjacent to the packing station 122 before the course reaches again the receiving station 120 where the circuit starts again. The respectively four conveying lines 28 of the sorting stages 142 actually represent respectively one sorting stage or cascade. However, if these stages are passed twice, four sorting stages can be achieved in terms of sorting logic. Within the modules 12-1 to 12-4 the load supports 16 can rotate arbitrarily often, wherein the conveying lines of the module 12-1 and the first conveying line 28 of the module 12-2 are not part of this line which in turn is self-contained.

The system 10 of FIGS. 1A-C in this case comprises one bottom 134 (see module 12-6 in FIG. 1C) and one ceiling 136 (see module 12-7 in FIG. 1C). The ceiling 136 can be formed transparent for supplying at least the workstations 125 with daylight. The bottom 134 is selected such that the staff 124 can walk safely on the bottom 134. It is clear that the bottom 134 and the ceiling 136 can be omitted, particularly if the system 10 comprises several levels arranged on top of each other. Preferably, however, exterior sides of the system 10 are formed closed.

As shown in FIG. 1C, a bottom side of the overhead conveyor 14 is arranged in a height H1 corresponding to a distance between a bottom side of the guiding rail 22 and a top side of the bottom 134. The guiding rails 22 are hanging down into a height H2. The sum of the height H1 and H2 corresponds to a distance between a bottom side of the support struts 82 and a top side of the bottom 134.

FIG. 9A shows a modified type of a support structure 30 which in turn is fit into a parallelepiped 40, i.e. defines the parallelepiped 40. The base frame 38 is again formed by the struts 32, 34, and 36 which are shown in FIGS. 9A and 9B by means of solid lines. The support structure 30 further comprises the support struts 82 which are indicated in terms of dashed lines. The base frame 38 has a H-shape in the area of the front sides 46. These H-shapes are connected to each other at half height by means of the longitudinal struts 32. The longitudinal struts 32 and the transversal struts 34 define a first plane E1 in which supports struts 82 can be arranged in order to mount a first overhead conveyor at a first height which is not shown here in more detail. The top side 42 of the parallelepiped 40, which among other things is indicated by means of dotted lines, can define a second plane E2 at which additional supports struts 82 can be arranged, in order to install a second (not shown) overhead conveyor above the first overhead conveyor.

Alternatively, the H-shape can be replaced by an I-shape as shown in FIG. 9B. The support structure 30 of FIG. 9B comprises only one single plane. Three support struts 32 extend, for example, along the longitudinal direction X so that three lines run in parallel to each other, for example, as required in the module 12-1 of FIG. 1A. The vertical struts 36 can be arranged slightly displaced from the geometrical center.

In the following some particular advantages of the system concept of the invention will be listed briefly.

The system 10 can be set up as an extension to, or as replacement of, an existing system without affecting the running operation of the existing system, and can be started up within short time, for example, within one week. The system 10 can be set up at any arbitrary location, for example, also on a parking space adjacent to the existing facility of the company. The system 10 can be connected without interruption to the existing system, i.e. while the existing system is still operated. The system 10 can be rent or leased.

In case of an overhead conveyor, for example, 1000 parts can be transported each hour at a distance of 155 mm between the parts. This corresponds to an average conveying velocity of 2.5 m/minute.

Up to three conveying lines can be integrated in parallel along the longitudinal direction into the size grid of a conventional ISO container, wherein parts passing each other are not in contact.

The modules 12 represent a mechatronic product allowing integration, in particular of a hanging conveyor, into a portable support structure having side walls which can be removed optionally.

A reduction of a turn-around time of the system project is provided by:
savings during the (layout) design phase, wherein pre-defined modules are used;
savings during the procurement and manufacturing phase, because the modules can be prefabricated and, if necessary, only require little adaptations;
transport and installation happen fast since the modules itself in terms of transport units are stable and are installed without any change at the system operator;
set-up happens fast since the modules are previously tested, in particular with regard to the control and IT.

The modules are flexible and can be reused. The modules can be disassembled easily and can be reused on another site for the same, or a modified, functional task. Also, changes of configuration and system extensions can be conducted without change of location, if a type of problem (volume, order structure, order cycle, product spectrum, etc.) changes.

Finally, the costs are significantly reduced by shifting work from the construction site towards an industrial production which is implied by the degree of prefabrication.

The start-up and design risk is reduced too.

In the above description of the figures, the selection of the orientation of the coordinate system is in accordance with the designations typically used in the field of intralogistics so that the longitudinal direction has been designated by X, the transversal direction by Z, and the (vertical) height by Y.

Further, same parts and features have been provided by the same reference numerals. Disclosures contained in the description can be transferred logically to similar parts and features having the same reference numerals. Position and orientation indications (e.g., "on top", "below", "laterally", "longitudinally", "horizontally", "vertically" and the like) refer to the immediately described figure. If the position or orientation is changed, these indications are to be transferred logically to the new position and orientation.

LIST OF REFERENCE NUMERALS 10 (overhead) conveyor system
12 (transport) module
14 (overhead) conveyor
16 load support
18 bags
20 hooks
22 vehicle rail
24 course
26 conveying direction
28 conveying lines
30 support structure
31 edges of 40
32 longitudinal struts
34 transversal struts
36 vertical struts
XYZ coordinate system
38 base frame
40 parallelepiped
42 top side
44 bottom side
46 front sides
48 longitudinal sides
50 container corners
52 support-structure interface
54 body of 52
56 openings in 52
60 walls
62 openings
64 conveyor interface
66 sorting device
68 conveyor input
70 conveyor output
72 switches
74 sensors
76 control device
78 lines
80 wireless
82 support struts
84 connecting device
86 grid, lattice-shaped
a,b grid constant
88 ceiling holder
90 conveyor components
92 straight element
94 curved element
R radius of 92
96 stopper
98 actuators
100 software
102 drive unit
104 transport means
106 frame
108 wiring
110 hardware
120 receiving station
122 packing station
124 staff
125 workstation
126 steady conveyor
128 hanger
130 hanging goods (garments)
132 pushing carriage
134 bottom
136 ceiling
H1 height of 14
H2 hanging height
H3 height of 84
H4 light height of 12
140 prebuffer
142 sorting stages
144 afterbuffer

What I claim is:

1. A portable conveyor system comprising a modularly constructed conveyor and a plurality of transport modules each formed of a plurality of previously installed and previously tested conveyor components, wherein the modules are arranged directly adjacent next to each other and/or on top of each other for commonly forming the system in a connected state,
  wherein the conveyor comprises:
    a plurality of conveying lines commonly forming, with regard to material flow, a predefined course of conveying lines, wherein each of the conveying lines comprises a separate machine frame;
    at least one drive unit;
    at least one control device; and
    a transport device movable along the course of conveying lines by the at least one drive unit in order to transport load supports through the system; wherein each of the plurality of modules comprises:
    a standardized exterior dimension;
    a support structure, a dimension of which is adapted to the standardized exterior dimension; and
    at least one of the conveying lines, wherein the machine frame of the at least one of the conveying lines is connected permanently to the support structure along a uniform grid;
  wherein each of the plurality of modules comprises at least one spatially standardized conveyor interface, wherein the at least one conveyor interface is adapted to couple, in terms of material flow, to another spatially standardized conveyor interface of one of the modules arranged directly adjacent thereto; and
  wherein the spatially standardized conveyor interfaces are defined along the uniform grid.

2. The system of claim 1, wherein the modularly constructed conveyor is an overhead conveyor.

3. The conveyor system of claim 1, wherein each of the plurality of modules comprises at least one spatially standardized support-structure interface, wherein the at least one support-structure interface is adapted to be mechanically connected to a corresponding support-structure interface of one of the modules arranged directly adjacent thereto; and
  wherein the course of conveying lines and the dimensions of the modules are orientated along the spatially standardized uniform grid such that there exists only one single uniform grid along which the modules, the support structure, the course, the support-structure interfaces, and conveyor interfaces are orientated.

4. The conveyor system of claim 1, wherein each of the plurality of modules is adapted to be transported by mass-transportation from one site of a system operator to another site of the system operator.

5. The conveyor system of claim 1, wherein each of the plurality of modules comprises at least one conveyor input and at least one conveyor output.

6. The conveyor system of claim 1, wherein the exterior dimension of each of the plurality of modules corresponds to an exterior dimension of a standardized large-capacity container.

7. The conveyor system of claim 1, wherein the support structure defines a parallelepiped, wherein the support structure comprises: longitudinal struts; transversal struts; and vertical struts; and wherein the parallelepiped comprises: a top side and a bottom side, which are arranged oppositely in a vertical direction of the module; first and second front sides being arranged oppositely to each other in a longitudinal direction of the modules; and first and second longitudinal sides being arranged oppositely in a transversal direction of the modules.

8. The conveyor system of claim 1, wherein the support structure comprises a base frame comprising longitudinal struts, transversal struts, and vertical struts, the struts being connected to each other permanently and spatial positions of the struts correspond to edges of a parallelepiped.

9. The conveyor system of claim 8, wherein the base frames of the modules are formed identically.

10. The conveyor system of claim 8, wherein each of the base frames comprises container corners.

11. The conveyor system of claim 10, wherein the container corners are arranged in corners of the parallelepiped.

12. The conveyor system of claim 8, wherein the support structure comprises additional support struts connected to the base frame along the uniform grid.

13. The conveyor system of claim 12, wherein the base frame comprises a plurality of receiving devices, wherein each of the receiving devices is configured to receive a support strut, and wherein each of the receiving devices is arranged at an imaginary intersection of the uniform grid with the base frame.

14. The conveyor system of claim 7, wherein the sides are closable by removable walls.

15. The conveyor system of claim 1, wherein the conveyor comprises at least one of the following conveyor components: at least one guiding rail, ceiling holders, a control device, a drive unit, a switch, a stopping device, a wiring, and a sensor.

16. The conveyor system of claim 1, further provided with a conveyor clutch being configured to mechanically connect to each other conveyor interfaces of the modules being arranged directly adjacent.

17. The conveyor system of claim 1, wherein each of the plurality of modules represents a functional type selected of a group which comprises at least one of the following functional types: a workstation for loading/unloading load supports; a buffer for temporarily storing the load supports; a sorting device for sequencing the load supports in accordance with a predetermined sequence; and a transport line for moving the load supports along straight elements and curved elements.

18. A portable transport module for being installed in a conveyor system which comprises a modularly constructed conveyor and a plurality of modules, wherein the modules of the system can be arranged directly adjacent next to each other and/or on top of each other for commonly forming the system in a connected state, and wherein the portable module comprises:
  a plurality of previously installed and previously tested conveyor components forming at least one conveying line which is, with regard to material flow, part of a previously defined course of conveying lines;
  a standardized exterior dimension; and
  a support structure, a dimension of which is adapted to the standardized exterior dimension;
  wherein each of the conveying lines is connected permanently to the support structure along a uniform grid;
  wherein the portable module comprises at least one spatially standardized conveyor interface, wherein the at least one conveyor interface is adapted to couple, in terms of material flow, to another spatially standardized conveyor interface of another portable module arranged directly adjacent thereto; and
  wherein the spatially standardized conveyor interfaces are defined along the uniform grid.

19. The conveyor system of claim 1, wherein the support structure comprises a base frame comprising longitudinal struts, transversal struts, and vertical struts, the struts being connected to each other such that spatial positions of the struts correspond to edges of a parallelepiped; and wherein the support structure encloses the machine frame of the at least one conveying line that is permanently connected to the support structure.

* * * * *